Oct. 10, 1944.  R. D. SMITH  2,360,171
AUTOMOTIVE TOOL
Filed Feb. 5, 1942  2 Sheets-Sheet 1

Inventor
Roy D. Smith
By Merrill M. Blackburn
Attorney

Oct. 10, 1944.  R. D. SMITH  2,360,171
AUTOMOTIVE TOOL
Filed Feb. 5, 1942  2 Sheets-Sheet 2

Inventor
Roy D. Smith
By Merrill M. Blackburn
Attorney

Patented Oct. 10, 1944

2,360,171

UNITED STATES PATENT OFFICE 2,360,171

AUTOMOTIVE TOOL

Roy D. Smith, Bettendorf, Iowa, assignor to Bee Line Manufacturing Company, Scott County, Iowa, a corporation of Iowa Application February 5, 1942, Serial No. 429,630

7 Claims. (Cl. 153—38)

The present invention pertains to an automotive tool for the bending of metal parts, especially those constituting a part of the running gear of a motor vehicle. Among the objects of this invention are to provide a tool which can be easily applied to a part which is to be bent and which will automatically hold itself in position thereon when once applied; to provide a tool of the character indicated which is easily operated and which will function efficiently when in use; to provide a tool of the character indicated which may be applied to various parts of the running gear of a motor vehicle to cause adjustment thereof; to provide a tool of the character indicated which may be easily adjusted to fit various parts of the vehicle, as such may be needed; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire it understood that this disclosure is illustrative only and I do not wish to be limited to the specific details shown.

In the drawings annexed hereto and forming a part hereof,

Figure 1:
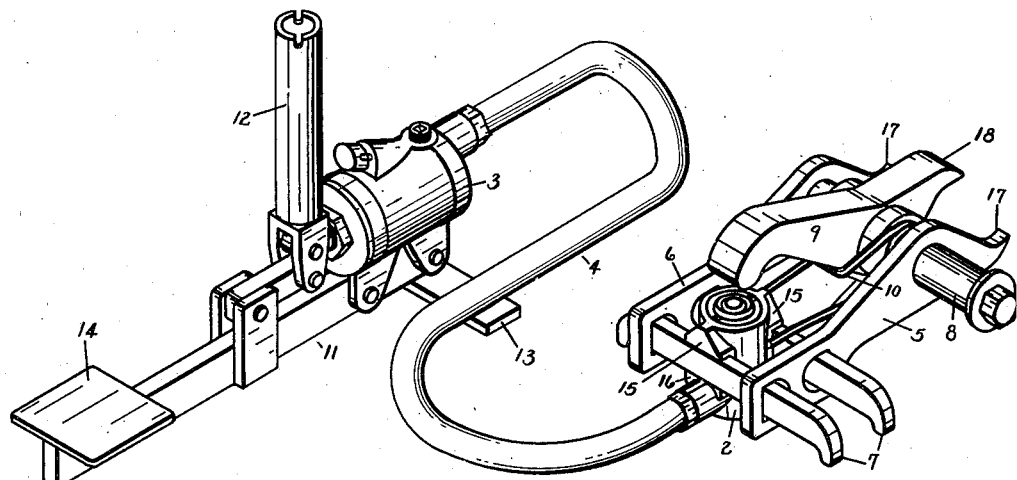
Fig. 1 represents a perspective of the tool constituting the subject matter of my present invention.

Reference will now be made in greater detail to the annexed drawings for a more complete description of this invention. The tool comprises a bending unit 1, a jack 2, a pump 3, and a flexible tube 4 connecting the pump with the jack. The bending tool comprises a pair of side plates 5 and 6, a pair of jack-supporting bars 7, a pivot member 8, a lever 9, and a spring 10. As usual, the jack comprises a cylinder and a piston, while the pump comprises a cylinder, a piston, supporting means 11 therefor, and a piston-operating handle 12. For convenience, the supporting means is provided with a crossbar 13 and a foot-rest 14.

Figure 2:
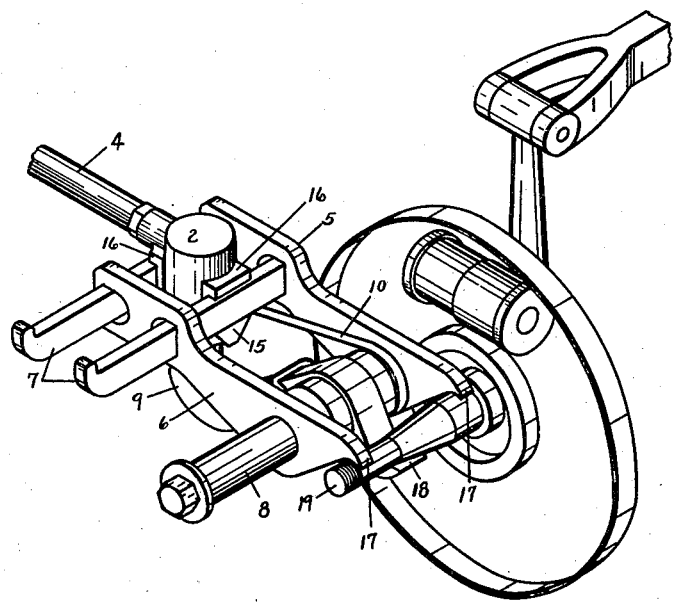
Fig. 2 illustrates the use of this invention in the application of force to a motor vehicle spindle in causing adjustment thereof.

As seen most clearly in Figs. 1 and 2, the jack is provided with supporting arms 15 and 16 whereby it may be supported on the crossbars 7 and between the side plates 5 and 6. The crossbars 7 extend through openings adjacent one end of the side plates 5 and 6, and the pivot member 8 is remote therefrom but somewhat removed from the opposite end of the side plates. The extremities of the second ends of the side plates are provided with hooks 17 for engagement with the metal part to be bent and are so positioned that, when bending force is applied, the hooks will prevent the part being bent from sliding away from the side plates. A lever 9 is provided with a comparable hook nose 18 to cooperate with the hooks 17 in holding the tool assembled with the part to be bent.

As is clear from Figs. 1 and 2, the spring 10 has a tendency to turn the lever 9 about the pivot 8, with relation to the side plates 5 and 6, so that the tool will be held clamped to the part to be bent, this being shown in Fig. 2 as the wheel spindle, indicated by the numeral 19. When used as shown in Fig. 2, this tool bends the spindle in a direction to correct accidental bends thereof. The positioning of the tool upon the spindle is dependent upon the direction of the bend it is desired to make.

Figure 3:
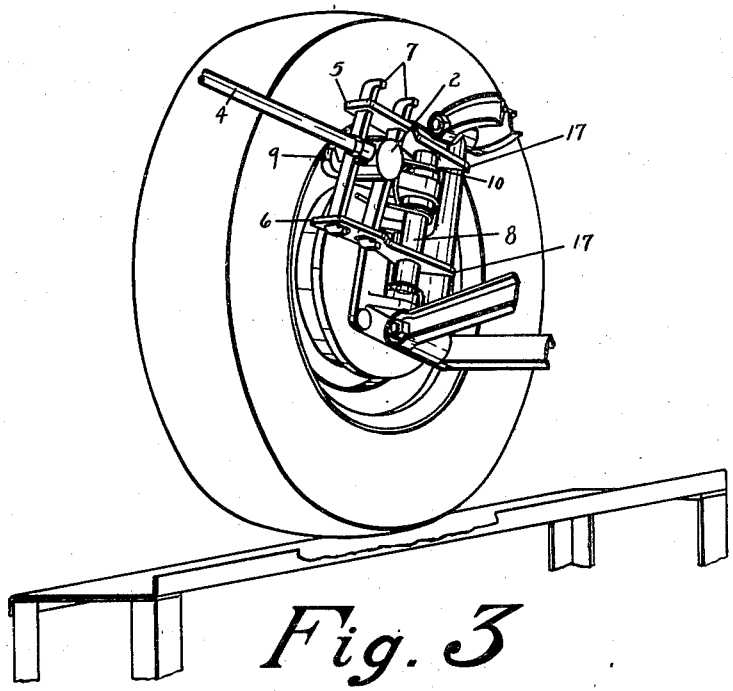
Fig. 3 represents a perspective view of this tool applied to the vertical arm of a motor vehicle spring suspension when adjusting camber.

When the tool is applied to the vertical arm, as shown in Fig. 3, and pressure is applied, the intermediate portion of the vertical arm is bent inwardly, thus decreasing camber. Bending the vertical arm in the opposite direction will obviously increase camber. If the tool is turned about the vertical arm as an axis, approximately 90°, and then force is applied, the vertical arm will be bent in its intermediate portion, either forwardly or backwardly, depending upon the relative positions of the hooks 17 and 18. This will result in either increasing or decreasing the caster, depending upon which way the vertical arm is bent.

Figure 4:
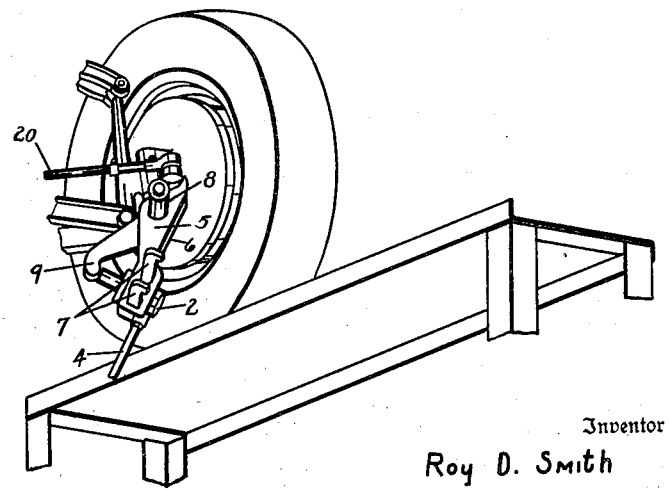
Fig. 4 represents the use of my device in the bending of the steering arm while adjusting turning radius.

In Fig. 4, the tool is shown applied to the steering arm to cause the free end of that to be bent inwardly which has the same effect as lengthening the connecting rod 20. This causes an increase in the toe-in. The opposite effect can be produced by reversing the tool so as to bend the intermediate portion of the steering arm inwardly, resulting in decrease of toe-in.

The use of this tool has been explained in connection with four different uses which may be made of it but it is to be understood that other uses, also, are possible. Furthermore, attention is called to the fact that the side plates 5 and 6 may be adjusted toward or away from each other to decrease or increase the space between them in accordance with the length of the part to be bent and the sharpness of the bend which is permissible.

Having now described my invention, I claim:

1. In a mechanism of the character described, in combination, a framework, a hydraulic jack and a lever mounted on the framework, and a source of fluid pressure connected to the jack to cause operation thereof; the framework comprising a pair of side plates and a plurality of cross-members connecting them for relative lateral adjustment with reference to each other, the jack being mounted on one pair of said plurality of cross-members adjacent one end of the side plates and having a plunger, another cross-member being spaced somewhat from the second end of the side plates and serving as a pivot, and said lever being pivoted on said pivot and extending at one end into proximity to the plunger of the jack in a position to be actuated thereby and at its other end into proximity to the second end of the side plates to cooperate therewith in holding and bending a member to be bent, said lever being pivotally mounted on said other cross-member and the side plates and lever being relatively slidable laterally on and with reference to said cross-members.

2. A structure as defined by claim 1 provided with spring means surrounding the pivot member for turning the lever on its pivot and causing it to cooperate with the side members in holding the tool in position for operation.

3. A tool of the character described comprising a supporting framework, a lever pivoted thereon, and a jack for operating the lever, the framework comprising a pair of side plates, a pivot member extending through the lever and the side plates and connecting the side plates at a point near one end thereof, and jack supporting means connecting the side plates adjacent the opposite end thereof, the jack being mounted on its supporting means in a position to engage the end portion of the lever more remote from its pivot and rock the lever about its pivot, the ends of the side plates and the lever nearer to the pivot member being hook-shaped to insure that the tool will be held attached to work when applied thereto, the side plates being slidable longitudinally of the pivot member and the jack supporting means to vary the relative positioning of said plates and lever.

4. A tool of the character described comprising a supporting framework, a lever pivoted thereon, a jack for operating the lever, the framework comprising a pair of side plates, a pivot member connecting the side plates at a point near one end thereof, and jack supporting means connecting the other end portions of the side plates, the jack being mounted on its supporting means in a position to engage the end portion of the lever more remote from its pivot and rock the lever about its pivot, the ends of the side plates and the lever nearer to the pivot member being hook-shaped to insure that the tool will be held attached to work when applied thereto, the side plates having openings in their ends more remote from the pivot member, the jack supporting means extending through said openings and the jack being supported on and slidable along said supporting means, and the lever being correspondingly slidable along the pivot member to keep the jack and lever similarly positioned relatively to the side plates.

5. In a mechanism of the character described, in combination, a framework, the framework comprising a pair of side plates and a plurality of cross-members connecting them for relative movement toward and from each other, another cross-member being spaced somewhat from the second end of the side plates and serving as a pivot, said other cross-member connecting the side plates for relative movement toward and from each other, a lever pivoted on said pivot and extending at its ends into proximity to the ends of the side plates to cooperate therewith in holding and bending a member to be bent, said lever being located between the side plates, the side plates being relatively adjustable laterally on said cross-members, and spring means for turning the lever on its pivot and causing it to cooperate with the side members in holding the tool in position on the article to which it is attached.

6. An automotive tool comprising a pivot member and a pair of similarly shaped side plates having cooperating ends and said plates being slidably mounted upon said pivot member and connected together in relatively adjustable relation thereby, a lever on the pivot member and extending in opposite directions therefrom, with its longitudinal axis approximately parallel to the longitudinal axis of the side plates, the lever being connected to and movable longitudinally of the pivot member, supporting means movably connecting a pair of corresponding ends of said side plates, said side plates being relatively movable longitudinally of and along said pivot member and said supporting means, a jack mounted on said supporting means for sliding movement therealong transversely with respect to the side plates whereby the jack and lever may be brought into cooperative functional relationship at different points along the pivot member and the jack supporting means, said jack having a plunger, the plunger of the jack, when in operation, being positioned to engage one end of said lever to swing the lever in one direction about the pivot member, the second end of the lever and the ends of the side plates corresponding thereto being shaped to receive between them, in bending relation, a part to be bent, and a source of power for the operation of the jack plunger.

7. In an automotive tool, in combination, a pair of side plates to engage one side of a member to be bent, said plates having ends, a pivot member connecting said plates at corresponding points intermediate the ends in slidable relation with reference to the pivot member, supporting bars connecting said side plates in a region remote from the pivot member, said plates and supporting bars being connected in sliding relationship, a lever pivotally mounted on said pivot member between the side plates, and having an end extending into the same general locality as one pair of ends of the side plates to engage a member to be bent but engaging said member upon the opposite side from that engaged by said side plates, said lever having an opening therethrough, having the pivot member extending through the opening and being slidable along the pivot member to approach one or the other of the side plates, a jack slidably mounted on the supporting bars to slide into positions to engage the second end of the lever as that is adjusted, and operating means for the jack to cause extension thereof whereby to turn the lever on its pivot to cause bending due to the action of the jack.

ROY D. SMITH.